(12) United States Patent
Yasuda et al.

(10) Patent No.: US 10,947,742 B2
(45) Date of Patent: Mar. 16, 2021

(54) RECYCLABLE SYNTHETIC RESIN TILE AND METHOD OF MANUFACTURING THE SAME

(71) Applicants: SHINKO KASEI CO., LTD., Hanyu (JP); DONGSHIN POLYMER CO., LTD., Hongseong-gu (KR)

(72) Inventors: Eitoku Yasuda, Hanyu (JP); Masataka Matsumoto, Hanyu (JP)

(73) Assignees: Shinko Kasei Co., Ltd., Hanyu (JP); Dongshin Polymer Co., Ltd., Chungcheongnam-do (KR)

( * ) Notice: Subject to any disclaimer, the term of this patent is extended or adjusted under 35 U.S.C. 154(b) by 189 days.

(21) Appl. No.: 16/080,889

(22) PCT Filed: Feb. 20, 2017

(86) PCT No.: PCT/JP2017/007262
§ 371 (c)(1),
(2) Date: Aug. 29, 2018

(87) PCT Pub. No.: WO2017/150397
PCT Pub. Date: Sep. 8, 2017

(65) Prior Publication Data
US 2019/0024390 A1    Jan. 24, 2019

(30) Foreign Application Priority Data
Mar. 4, 2016   (JP) .............................. JP2016-042886

(51) Int. Cl.
| B32B 5/02 | (2006.01) |
| B32B 27/04 | (2006.01) |
| B32B 27/20 | (2006.01) |
| B32B 25/02 | (2006.01) |
| B32B 27/12 | (2006.01) |
| B32B 27/32 | (2006.01) |
| B32B 3/30 | (2006.01) |
| B32B 27/08 | (2006.01) |
| B32B 27/36 | (2006.01) |
| E04F 15/10 | (2006.01) |
| E04F 15/00 | (2006.01) |
| B32B 27/30 | (2006.01) |

(52) U.S. Cl.
CPC .............. *E04F 15/107* (2013.01); *B32B 5/02* (2013.01); *B32B 25/02* (2013.01); *B32B 27/04* (2013.01); *B32B 27/12* (2013.01); *B32B 27/20* (2013.01); *B32B 27/32* (2013.01); *E04F 15/00* (2013.01); *E04F 15/105* (2013.01); *B32B 3/30* (2013.01); *B32B 27/08* (2013.01); *B32B 27/306* (2013.01); *B32B 27/36* (2013.01); *B32B 2250/05* (2013.01); *B32B 2260/021* (2013.01); *B32B 2260/046* (2013.01); *B32B 2260/048* (2013.01); *B32B 2262/10* (2013.01); *B32B 2262/101* (2013.01); *B32B 2264/10* (2013.01); *B32B 2270/00* (2013.01); *B32B 2274/00* (2013.01); *B32B 2307/402* (2013.01); *B32B 2307/4023* (2013.01); *B32B 2307/41* (2013.01); *B32B 2307/412* (2013.01); *B32B 2307/414* (2013.01); *B32B 2307/732* (2013.01); *B32B 2307/744* (2013.01); *B32B 2471/00* (2013.01)

(58) Field of Classification Search
None
See application file for complete search history.

(56) References Cited

U.S. PATENT DOCUMENTS

| 8,001,741 | B2 | 8/2011 | Duernberger |
| 8,298,650 | B2 | 10/2012 | Reichwein et al. |
| 2014/0242342 | A1* | 8/2014 | Vandevoorde .... E04F 15/02022 428/157 |
| 2017/0130013 | A1* | 5/2017 | Bastin ...................... C08J 5/043 |

FOREIGN PATENT DOCUMENTS

| EP | 843763 | A1 | 5/1998 |
| EP | 969164 | A2 | 1/2000 |
| JP | 51077761 | A | 7/1976 |
| JP | 57033730 | A | 2/1982 |
| JP | 62006664 | A | 1/1987 |
| JP | 63001034 | A | 1/1988 |
| JP | 3051530 | U | 8/1998 |
| JP | 10266532 | A | 10/1998 |
| JP | 2597753 | Y2 | 12/1999 |
| JP | 3470757 | B2 | 11/2003 |
| JP | 2004156165 | A | 6/2004 |
| JP | 2004175023 | A | 6/2004 |

(Continued)

OTHER PUBLICATIONS

Int'l. Search Report issued in Int'l. App. No. PCT/JP2017/007262, dated Apr. 4, 2017.

*Primary Examiner* — Sheeba Ahmed
(74) *Attorney, Agent, or Firm* — Greer, Burns & Crain Ltd.

(57) ABSTRACT

Provided are a recyclable synthetic resin tile to be laid contributing to establishment of a recycling-oriented society, and a method of manufacturing the same.

A recyclable synthetic resin tile to be laid wherein a main constituent resin includes an olefinic thermoplastic resin and/or thermoplastic elastomer, and the tile includes a base part in which a decorative layer, two or more intermediate layers, and a balance layer are laminated in this order, and a layer of the intermediate layers includes an inorganic fiber layer, and the decorative layer and the balance layer are shaped to be concave-convex.

17 Claims, 6 Drawing Sheets

(56) References Cited

FOREIGN PATENT DOCUMENTS

| | | | |
|---|---:|---|---|
| JP | 3741200 | B2 | 2/2006 |
| JP | 2006112134 | A | 4/2006 |
| JP | 2006125025 | A | 5/2006 |
| JP | 3882733 | B2 | 2/2007 |
| JP | 2007077568 | A | 3/2007 |
| JP | 4053391 | B2 | 2/2008 |
| JP | 2008520853 | A | 6/2008 |
| JP | 2008221520 | A | 9/2008 |
| JP | 4511896 | A | 7/2010 |
| JP | 2014224390 | A | 12/2014 |

* cited by examiner

EXAMPLE OF PLANAR SHAPE OF PROTRUDING PORTION

PLANE IS REGULARLY OR IRREGULARLY ARRANGED IN A PATTERN SHAPE

552: RECESSED PORTION

SCHEMATIC DIAGRAM OF EMBOSSING ON BOTH SURFACES

RECYCLABLE SYNTHETIC RESIN TILE AND METHOD OF MANUFACTURING THE SAME

This is a National Phase Application filed under 35 U.S.C. § 371, of International Application No. PCT/JP2017/007262, filed Feb. 20, 2017, the contents of which are incorporated by reference.

TECHNICAL FIELD

The present invention relates to a recyclable synthetic resin tile, and more particularly, to a recyclable synthetic resin tile which has moderate hardness and a cushioning property, is stably fixed and held on a floor surface, has good dimensional stability or thermal stability, has an excellent laying property, and is environmentally friendly.

BACKGROUND ART

Conventionally, since a resin tile has characteristics such as elasticity, an excellent walking feeling, and abundant colors and patterns, as flooring for an internal finish, the resin tile is used in shops, offices, common space of collective residences, a floor of houses, or the like.

Among these resin tiles, a tile made of a vinyl chloride-based resin are is mainly used, since the tile is inexpensive, and particularly has elasticity to have an excellent walking feeling, or the tile is used for generating an operational effect of greatly mitigating impact.

In the case of constructing the resin tiles by sticking them on a mortar or concrete floor, a wooden floor, a stone floor or the like, in general, a method in which an adhesive, a tackifying agent or the like is first applied on a floor surface, and the tiles are stuck thereon is used.

Accordingly, in the conventional method of constructing the resin tiles, operation of applying an adhesive, a tackifying agent or the like was complicated, and there was a demerit of bad repairability (hard to be replaced) such as difficulty in peeling off the resin tile when repairing the tile, and a fear of damaging the tile or a floor surface.

In addition, it was suggested that in order to construct tiles without using the adhesive or the tackifying agent, an inorganic fiber layer is introduced to secure dimensional stability to impart a laying property, or anti-slip processing such as an adsorption type is carried out (U.S. Pat. No. 8,298,650 B2 (Patent Literature 1), JP 4053391 B2 (Patent Literature 2).

Meanwhile, by a method of forming an engaged joint portion around a wooden floor finish being a center, constructability is improved or a response to dimensional change is being made, however, a technique to apply this method to a resin-based tile also is suggested in the following patent literatures and the like.

That is, see JP 3882733 B2 (Patent Literature 3), JP 2008-520853 A (Patent Literature 4), JP 3470757 B2 (Patent Literature 5), EP 0969164 B1 (Patent Literature 6), EP 0843763 B1 (Patent Literature 7), etc.

However, in a resin-based tile which emphasizes dimensional stability, a method of making improvement by increasing a content of a filler, or by forming a glass fiber layer as reinforcement, or the like is suggested.

The tiles having a high content of the filler has a fragile joint portion and the application thereof is difficult.

When attempting to change a part of the laid resin tiles due to defects or the like, the joint portion is damaged or cannot be laid again without peeling the surroundings, and repairability thereof is bad.

Meanwhile, recently, for establishment of a recycling-oriented society, a law for promoting recycled resources utilization (recycling law) was established in various fields. A vinyl chloride resin is easy to recycle, however, when waste materials are recycled, the resin is difficult to recycle, since the resin includes an adhesive and a floor surface base material.

For solving the problem, it was suggested to allow a decorative layer to be separable, thereby reusing the base material portion being a core, and for example, JP 2006-125025 A (Patent Literature 8), JP 2006-112134 A (Patent Literature 9) or the like is known in the art.

In this method, when a decorative sheet is stuck on the site, workability is complicated due to being mixed with dust, distortion of design, surrounding cut mistakes, and the like, and when a decorative layer is replaced in a different place, there are problems such as place and movement expenses or damage in a core portion, and economic feasibility is not good for recycling.

In addition, it was suggested that a base material is laid down on a floor surface before constructing flooring, and tiles to be laid (loose lay tiles) are constructed. For example, JP H10-266532 A (Patent Literature 10), JP 2014-224390 (Patent Literature 11), and the like are known in the art.

However, though an adhesive is not used in the construction of the flooring, it is required that construction has two processes, and the base material is fixed with an adhesive or a tackifying agent, and though it is easy to replace the flooring, a special flooring structure is sometimes required, and economic feasibility is not good.

In addition, a phthalic acid-based plasticizer used in vinyl chloride resin tiles has a hormone action on a human body, and thus, the use thereof is restricted mainly in Europe and the United States. As a response to these problems, the plasticizer has been changed to those of the line not subjected to regulation, such as DOTP (dioctyl terephthalate). In addition, it is likely that the use of the vinyl chloride resin itself is also regulated.

It is required that a non-vinyl chloride resin tile which meets the regulations and conditions and has equivalent performance to a resin tile made of vinyl chloride is environmentally friendly and easily recyclable.

For an olefin resin tile which is the non-vinyl chloride resin tile, a method of adding scaly minerals to a constituting layer for adhesiveness improvement and sticking the tiles by an adhesive layer, for example, as disclosed in JP 5177761 B2 (Patent Literature 12), or a method of improving adhesiveness with a floor surface by a combination of an ethylene-vinyl acetate resin having a concentration of 50% or more of vinyl acetate and an olefinic resin with an inorganic filler, for example, as disclosed in JP 3741200 B2 (Patent Literature 13) has been suggested; however, when an adhesive is used in adhesion between layers, it is difficult to recycle wastes produced during production, and when adhesion with a floor surface is improved, construction is performed using an adhesive, and thus, it is not possible to recycle waste flooring after use.

In addition, a method of satisfying various performances as flooring obtained by adding an inorganic filler to a combination of an ethylene copolymer resin and a styrene-based or olefinic thermoplastic elastomer was suggested in, for example, JP 451189682 (Patent Literature 14); however, in a specification of flooring without a so-called, decorative layer, a design property is poor, and since the tile is fixed on a floor surface with an adhesive and the like, there is a problem in that laying tiles is complicated and recycling is not possible.

An anti-slip sheet, in particular, a disposable anti-slip sheet was suggested, in which an anti-slip layer composed of LLDPE or LLDPE and a resin composition of an olefinic elastomer or a styrene-based elastomer is laminated on a base layer, and a surface layer may be laminated on an opposite surface of the base layer. For example, see the disclosure in JP 2004-175023 A (Patent Literature 15). In addition, as anti-slip processed flooring, it was suggested to form an anti-slip layer made of a non-foaming synthetic resin. For example, see the disclosure in UP 2004-156165 A (Patent Literature 16). However, it was not appropriate for the flooring which is a durable consumer good, as a disposable flooring, and did not have a sufficient anti-slip effect, as the smooth anti-slip layer.

Meanwhile, in terms of environmental problems, JP 5733730 B2 (Patent Literature 17) suggesting a floor tile using a biodegradable resin had a problem in recycling of wastes produced during production or replacement time (product life).

CITATION LIST

Patent Literature

Patent Literature 1: U.S. Pat. No. 8,298,650 B2
Patent Literature 2: JP 4053391 B2
Patent Literature 3: JP 3882733 B2
Patent Literature 4: JP 2008-520853 A
Patent Literature 5: JP 3470757 B2
Patent Literature 6: EP 0969164 B1
Patent Literature 7: EP 0843763 B1
Patent Literature 8: JP 2006-125025 A
Patent Literature 9: JP 2006-112134 A
Patent Literature 10: JP H10-266532 A
Patent Literature 11: JP 2014-224390 A
Patent Literature 12: JP 5177761 B2
Patent Literature 13: JP 3741200 B2
Patent Literature 14: JP 4511896 B2
Patent Literature 15: JP 2004-175023 A
Patent Literature 16: JP 2004-156165 A
Patent Literature 17: JP 5733730 B2

SUMMARY OF INVENTION

Technical Problem

The present invention has been made in view of the above description, and the object is to provide a recyclable synthetic resin tile to be laid contributing to establishment of a recycling-oriented society, and a recyclable synthetic resin tile to be laid having an anti-slip function, which are to be desired, and to provide a method of manufacturing a recyclable synthetic resin tile to be laid, and a method of manufacturing a recyclable synthetic resin tile to be laid having an anti-slip function by continuous lamination.

Solution to Problem

In order to achieve the above object, the present invention basically adopts the following technical constitution.

That is, a first embodiment according to the present invention is a recyclable synthetic resin tile to be laid, including a base part in which a decorative layer including at least a colored or colorless transparent layer, a printed layer and an opaque or translucent colored layer, two or more intermediate layers, and a balance layer are laminated in this order, wherein a main constituent resin includes an olefinic thermoplastic resin and/or thermoplastic elastomer, and a layer of the intermediate layers necessarily includes an inorganic fiber layer; and a second embodiment according to the present invention is a method of manufacturing a recyclable synthetic resin tile to be laid, wherein, in a process for producing a synthetic resin tile with utilizing a rolling apparatus and equipment having a laminator part and an embossing part on a continuous line to the rolling apparatus, while forming one of the intermediate layers (a first intermediate layer), an intermediate layers (including an inorganic fiber layer), a balance layer and a decorative layer which were previously prepared, are sequentially laminated on the first intermediate layer and/or one on other with each other so as to forma predetermined constitution thereof, the decorative layer and the balance layer are shaped by embossing.

A more preferred embodiment of the synthetic resin tile to be laid according to the present invention is a recyclable synthetic resin tile including the base part in which at least the decorative layer including the colored or colorless transparent layer, the printed layer and the opaque or translucent colored layer, the two or more intermediate layers (one of the intermediate layers necessarily including an inorganic fiber layer), and the balance layer are laminated in this order, wherein the decorative layer, the intermediate layer excluding the inorganic fiber layer, and the balance layer are formed with a resin composition including an olefinic thermoplastic resin and/or thermoplastic elastomer, and for example, a resin component forming the inorganic fiber layer is a resin composition containing at least an olefinic thermoplastic resin and/or thermoplastic elastomer, for securing adhesion with a layer sandwiching the inorganic fiber layer.

More specifically, a recyclable synthetic resin tile is provided in which, in addition to the above basic technical constitution, for securing adhesion with the balance layer of an anti-slip layer, a resin component forming the anti-slip layer contains at least an olefinic thermoplastic resin and/or thermoplastic elastomer, and the decorative layer and the anti-slip layer are shaped by embossing.

Advantageous Effects of Invention

In the present invention, it is possible to provide a recyclable synthetic resin tile to be laid which improves conventional defects, has good dimensional stability and thermal stability, has functions such as a laying property and easy repairability (replacement), is low cost, and has durability to contribute establishment of a recycling-oriented society, and a recyclable synthetic resin tile to be laid having an anti-slip layer placed on a bottom surface to have an anti-slip function, and also provide a low cost method of manufacturing the synthetic resin tile which can stably continuously produce the synthetic resin tile, by adopting the above-described technical constitution.

DESCRIPTION OF EMBODIMENTS

Hereinafter, a constitution of one specific example of the first aspect of the recyclable synthetic resin tile according to the present invention will be described in detail with reference to the drawings.

Figure 1A:
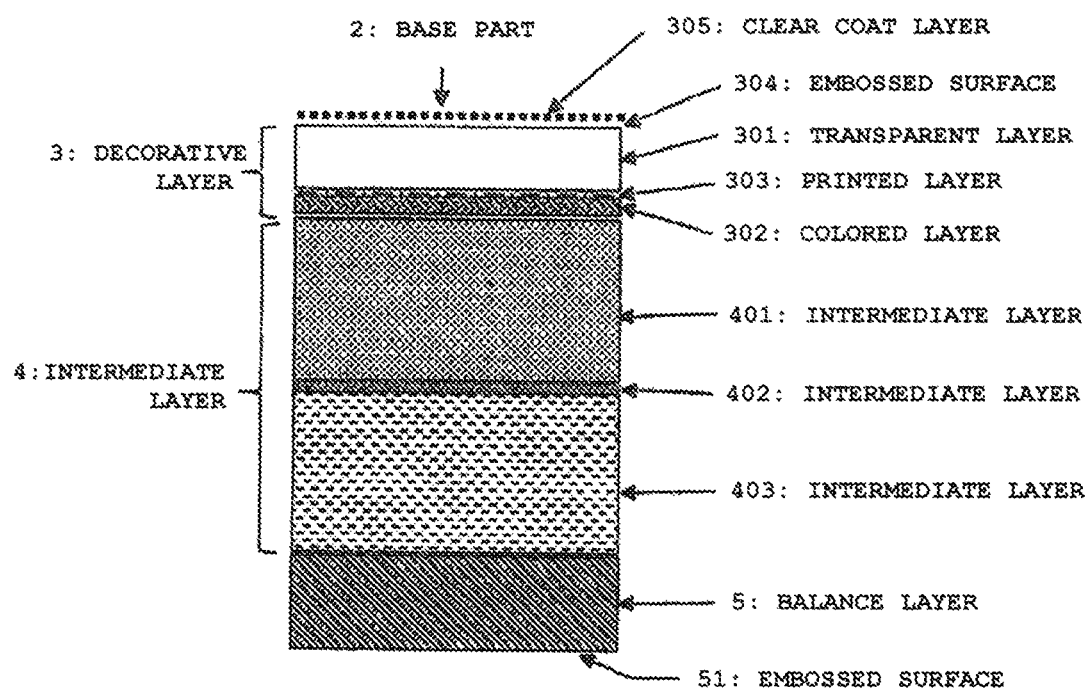
FIG. 1A is a vertical sectional view that illustrates one specific example of a basic constitution of a recyclable synthetic resin tile according to the present invention.

That is, FIG. 1(A) which is a sectional view illustrating a constitution of one specific example of a basic form of the recyclable synthetic resin tile 1 according to the present invention, shows a recyclable synthetic resin tile to be laid 1 wherein a main constituent resin of this tile includes one or a combination of two or more of an olefinic thermoplastic resin and/or thermoplastic elastomer, and the synthetic resin tile includes a base part 2 in which a decorative layer 3 including at least a colored or colorless transparent layer 301, a printed layer 303 and an opaque or translucent colored layer 302, two or more intermediate layers 4, and a balance layer 5 are laminated in this order, wherein one of the intermediate layers 4 includes an inorganic fiber layer, the decorative layer 3 is shaped by embossing, the balance layer 5 is shaped by embossing for increasing a surface area to secure adhesion, and the synthetic resin tile has a total thickness of 2.5 mm to 8 mm.

Further, the decorative layer 3 in the base part 2 of the present invention has a so-called transparent layer 301 including a sheet-shaped film body having a thickness of for example, 0.05 mm to 0.7 mm which includes a resin composition including the colored or colorless transparent olefinic thermoplastic resin and/or thermoplastic elastomer, a coloring agent and the like, and a so-called colored layer 302 disposed in a lower portion of the transparent layer 301, including a sheet-shaped film body having a thickness of for example, 0.05 mm to 0.20 mm and which being made of a resin composition which including the translucent or opaque, colored olefinic thermoplastic resin and/or thermoplastic elastomer, the coloring agent and the inorganic fillers including one or a combination of the same or different kind of inorganic materials having a different particle shape and/or particle diameter.

The printed layer 303 having an appropriate pattern, a geometric pattern or the like formed using an appropriate printing technique and the like may be disposed between the transparent layer 301 and the colored layer 302.

In addition, it is preferred that the printed layer 303 has a thickness of 1 to 20μ.

In addition, it is preferred that an embossed surface 304 which is shaped by embossing is formed on an upper surface of the transparent layer 301 in the decorative layer 3 of the present invention.

This embossed surface 304 improves tactile sensation of a surface of the synthetic resin floor tile 1, and at the same time allows the pattern formed on the printed layer 303 to be stereographically shown, thereby having an effect of improving a design property of the synthetic resin floor tile 1.

In addition, in the present invention, the embossed surface 304 may be shaped by subjecting the surface of the transparent layer 301 directly to an embossing process, or shaped by subjecting the decorative layer 3 in which the transparent layer 301, the printed layer 303, and the colored layer 302 are previously laminated to an embossing process.

On the embossed transparent layer 301, a clear coat layer 305 (resin coating film) may be formed, for scratch prevention, contamination prevention, antistatic purpose, or the like, and the clear coat layer 305 has a thickness of 3 to 30μ, more preferably 7 to 20μ.

Next, an intermediate layer 4 of the base part 2 according to the present invention has a predetermined thickness, and being made of a resin composition including a main constituent resin including one or a combination of two or more of an olefinic thermoplastic resin and/or thermoplastic elastomer, and further including an inorganic filler and the like, and it is preferred that the thickness of the intermediate layer is designed to be in a range of 0.5 to 6.0 mm.

In addition, the inorganic fiber layer 402 which is a layer selected from the intermediate layers 4, is a fabric structure of the inorganic fibers, and having a mass of 20 to 300 g/m$^2$, and which being coated with a resin composition containing at least the olefinic thermoplastic resin and/or thermoplastic elastomer, and the inorganic filler may be added to the resin composition. In a preferred specific example, the thickness of the inorganic fiber layer is, for example, 0.06 to 1.0 mm.

In addition, in the present specific example, the inorganic fiber layer 402 may be inserted into an inside of the intermediate layer 4 so as to complete its sheet fabrication of the intermediate layer 4, in an appropriate step during such sheet forming process for fabricating the intermediate layer 4, or the inorganic fiber layer 402 may be inserted between the plurality of intermediate layers 4 previously formed, respectively, in an appropriate thickness, so that the layers overlap each other in a sandwich shape so as to be integrated.

In the specific example, the inorganic fiber layer 402 is not limited to only one layer, but may be configured so that by using the plurality of inorganic fiber layers 402 and the plurality of intermediate layers 4, each one of the inorganic fiber layers 402 is respectively inserted into a respective space formed between the adjacently arranged intermediate layers 4 which being stacked with each other, so that each one of the inorganic fiber layers 402 is sandwiched by both intermediate layers 4 each being stacked with each other.

Meanwhile, at a bottom of the base part 2 in the present invention, a balance layer 5 is formed. The balance layer 5 comprises a synthetic resin composition which consisting of the olefinic thermoplastic resin and the olefinic thermoplastic elastomer, and an inorganic filler which being the same or different kind of materials or a combination of the same or different kind of materials having a different particle shape and/or a different particle diameter, and it is preferred to design the thickness in a range of, for example, 0.2 to 1.0 mm.

The balance layer 5 is shaped by embossing (having an embossed surface 51) for increasing a surface area to secure adhesion. Shaping by embossing is performed after lamination, but may be performed during manufacturing the balance layer.

In addition, in the present invention, it is also a preferable specific example that in the colored layer 302 of the decorative layer 3, the two or more intermediate layers 4 (excluding the inorganic fiber layer), and the balance layer 5, a main constituent resin has a resin composition ratio of the olefinic thermoplastic resin and thermoplastic elastomer being in a range of 20:80 to 80:20, and the inorganic filler included therein is one or a combination of the same or different kind of materials having a different particle shape and/or particle diameter, and is included at 150 parts or less including 0 parts in the colored layer 302 of the decorative layer 3, at 200 to 600 parts in the two or more intermediate layers 4 (excluding the inorganic fiber layer), and at 300 parts or less including 0 parts in the balance layer 5.

In addition, in the present invention, it is also a preferable specific example that in the colored or colorless transparent layer 301 of the decorative layer, the main constituent resin has a resin composition ratio of the olefinic thermoplastic resin and thermoplastic elastomer which is in a range of 40:60 to 70:30.

Figure 1B:
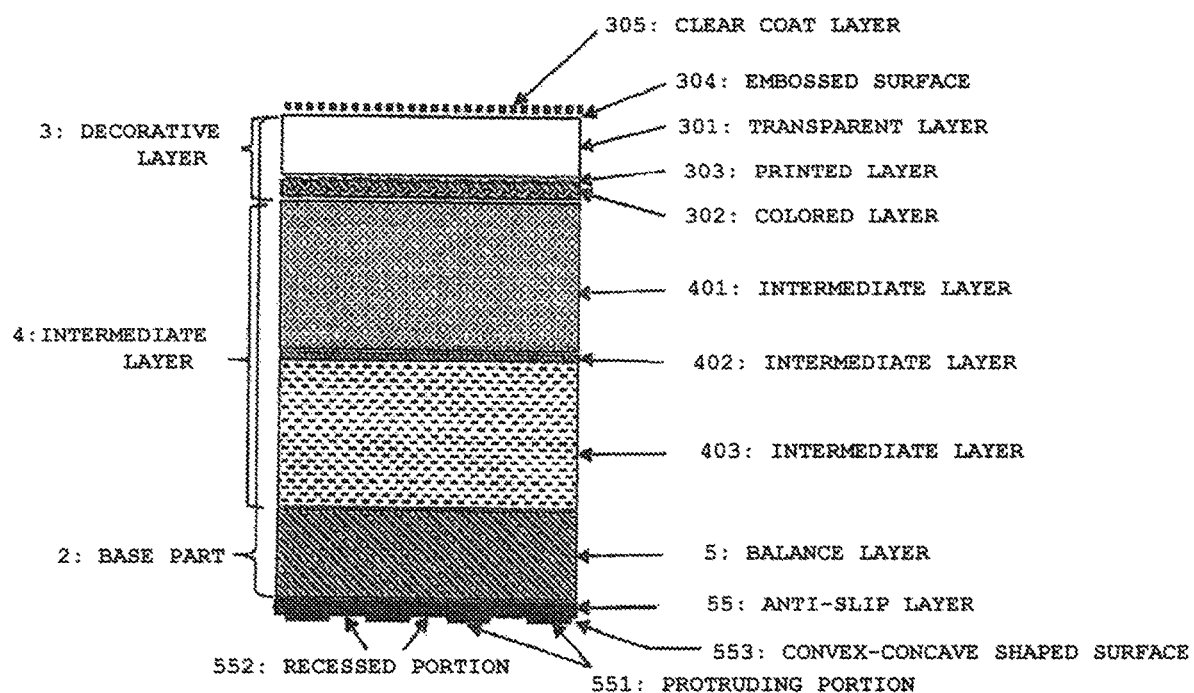
FIG. 1B is a vertical sectional view that illustrates another specific example of a basic constitution of the recyclable synthetic resin tile according to the present invention.
Figure 1C:
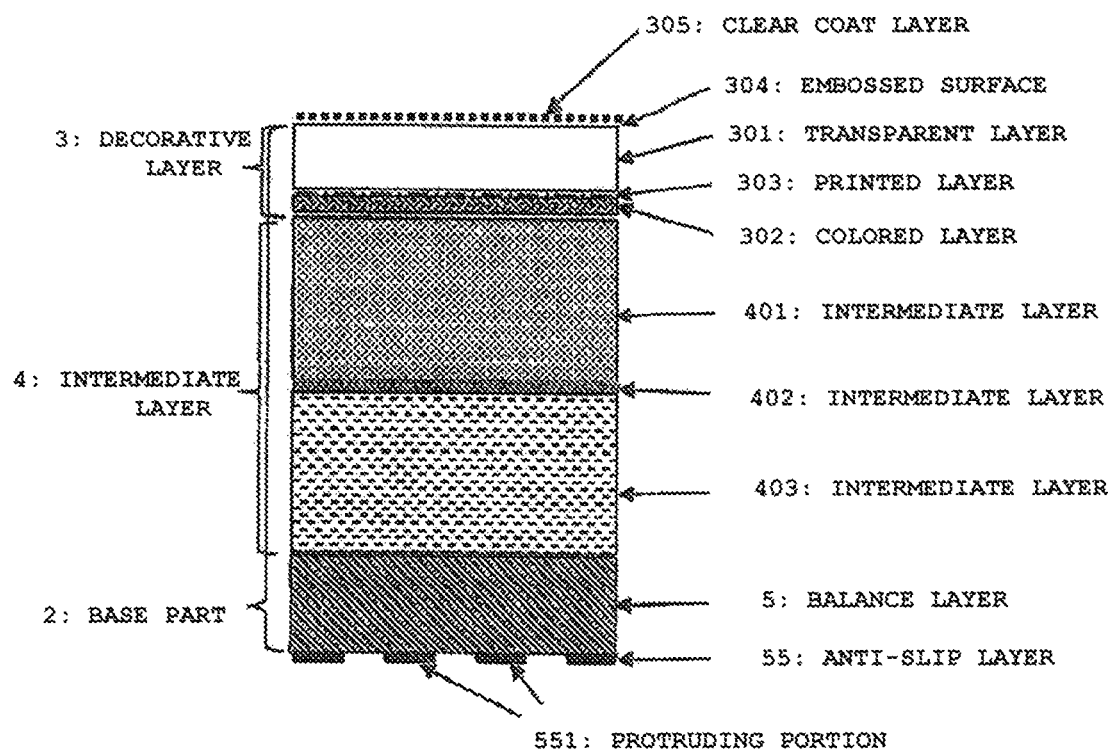
FIG. 1C is a vertical sectional view that illustrates yet another specific example of a basic constitution of the recyclable synthetic resin tile according to the present invention.

Another specific example of the first aspect of the present invention is a recyclable synthetic resin tile to be laid 1 having an anti-slip function configured so that for example, as illustrated in FIGS. 1(B) and 1(C), a decorative layer 3 including at least the colored or colorless transparent layer 301, the printed layer 303 and the opaque or translucent colored layer 302, two or more intermediate layers 4, and the balance layer 5 (up to here a base part 2) each of which being made of main resin composition which including the olefinic thermoplastic resin and/or thermoplastic elastomer, and an anti-slip layer 55 made of a resin composition in which the main resin forming the layer includes the thermoplastic resin and/or thermoplastic elastomer, are laminated in this order, and one of the intermediate layers is formed by an inorganic fiber layer 402.

Here, the base part 2 is the same as the base part 2 of the above specific example of the first aspect.

Meanwhile, in the present invention, the anti-slip layer is formed by the resin composition containing at least the olefinic thermoplastic resin and/or thermoplastic elastomer, and including one or two or more of the thermoplastic resin and/or thermoplastic elastomer, and the inorganic filler may be added to the resin composition. In a preferred specific example, the thickness is 0.2 to 1 mm.

In addition, in the present invention, it is one of the preferred specific examples that a surface of the anti-slip layer is shaped to be concave-convex by forming a pattern such as a linear shape or a geometric pattern, and a recessed portion formed by being surrounded by one or plural protruding portions produces no negative pressure therein when pressing force applied to the tile is released, and a height difference between the protruding portion and the recessed portion is in a range of 0.2 to 0.6 mm.

In addition, in the present invention, the anti-slip layer is a layer formed by forming a pattern such as smooth, linear or geometric patterns with the resin composition forming the anti-slip layer on the balance layer as a base material, and in a preferred specific example, the thickness thereof is in a range of 0.2 mm to 1 mm.

Figure 2:
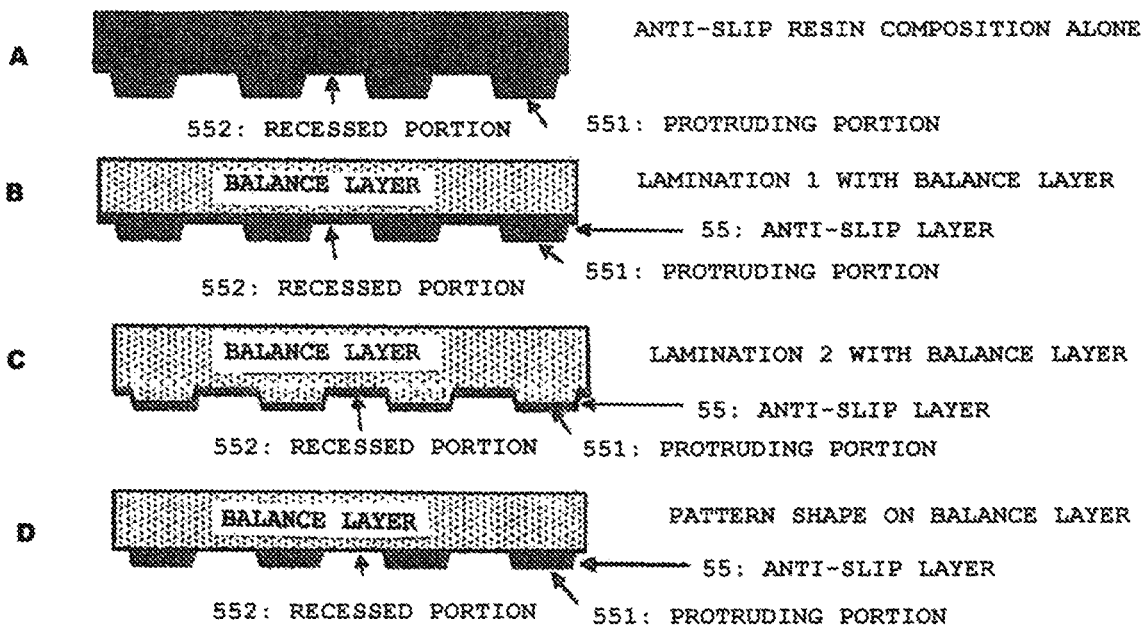
FIG. 2 is a vertical sectional view that illustrates a specific example of a sectional shape of an anti-slip layer applied to the recyclable synthetic resin tile according to the present invention.
Figure 3:
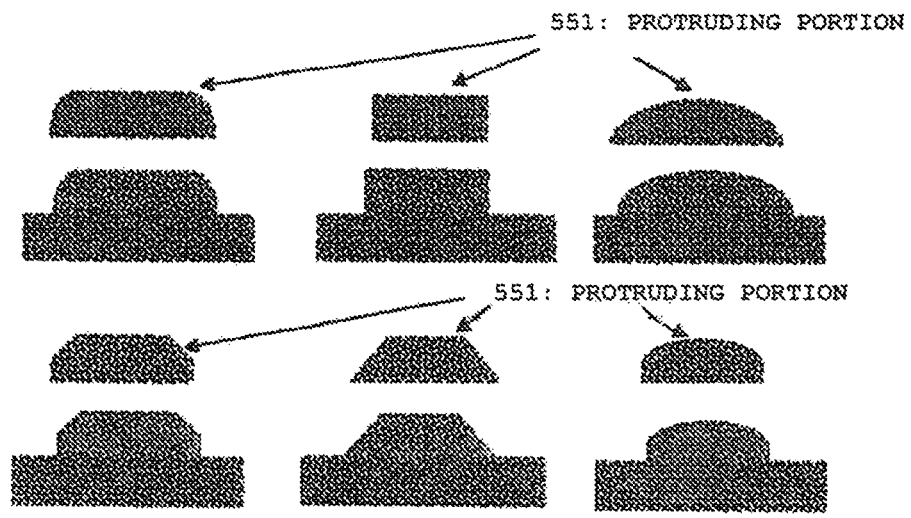
FIG. 3 is a vertical sectional view that illustrates a specific example of a sectional shape of a protruding portion formed on the anti-slip layer applied to the recyclable synthetic resin tile according to the present invention.
Figure 4:
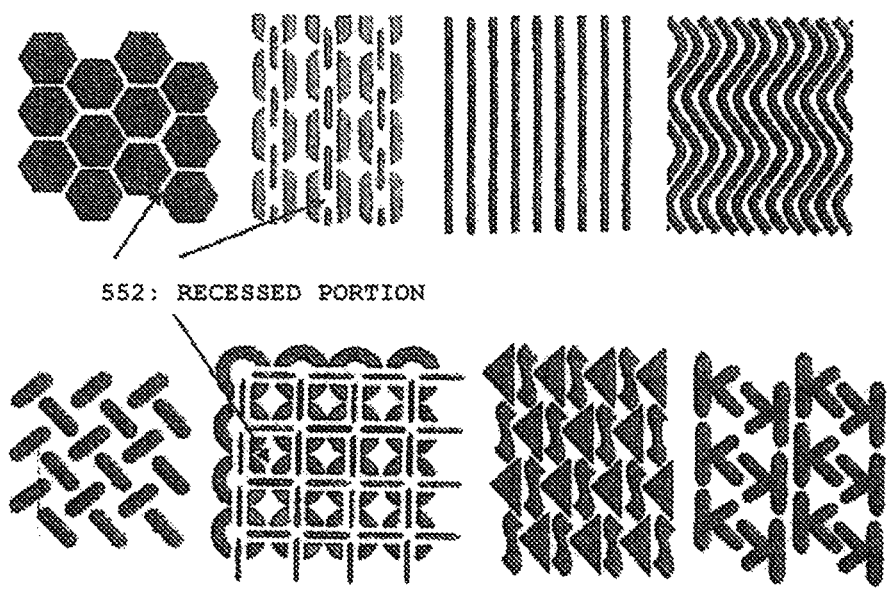
FIG. 4 is a plan view that illustrates a specific example of a planar shape and an arrangement shape of the protruding portion formed on the anti-slip layer applied to the recyclable synthetic resin tile according to the present invention.
Figure 5:
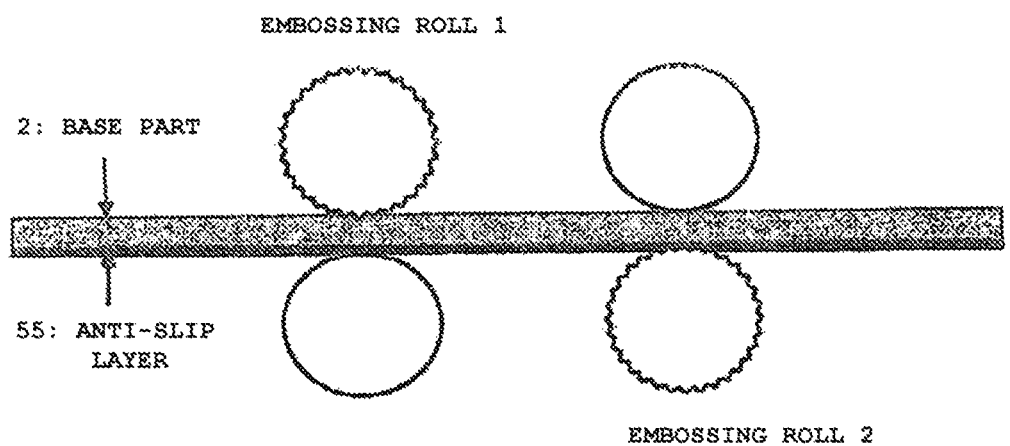
FIG. 5 is a side view that illustrates a constitution of one specific example of a double-sided embossing process used in a manufacturing process of the recyclable synthetic resin tile according to the present invention.

The configuration diagram, sectional shape and planar shape of the anti-slip layer are illustrated in FIGS. 2, 3 and 4, but the present invention is not limited thereto.

The shapes of the recyclable synthetic resin tile to be laid and the recyclable synthetic resin tile to be laid having the anti-slip function are generally square or rectangular, however, the tiles can be laid without any gap between the tiles, and thus the shape is not limited. In addition, it is not precluded to form fittings for joining the tiles around the tiles, and the fittings may be formed in a pair or more of opposite sides.

Here, in the present invention, an example of a preferred raw material used in each layer body portion of the base part 2 will be described below.

A specific example of a preferred constituent material used in each member is as follows.

That is, as a raw material to be used or a material to be used of each member used in the recyclable synthetic resin tile 1, basically, it is premised that the recyclable synthetic resin tile 1 is used as a recycle material, and thus, the synthetic resin is kneaded or compatible with at least a layer forming the synthetic resin tile without discomfort. It is a preferred specific example that the constitution contains the olefinic thermoplastic resin and/or thermoplastic elastomer.

(1) Olefinic Thermoplastic Resin

In the present invention, the olefinic thermoplastic resin is not particularly limited, and may include for example, a homopolymer of α-olefins such as ethylene, propylene, 1-butene, 3-methyl-1-butene, 3-methyl-1-pentene and 4-methyl-1-pentene, and a copolymer thereof, or a copolymer thereof with other copolymerizable unsaturated monomers.

As a representative example, polyethylenes such as a high density, medium density or low density polyethylene, a straight chain low density polyethylene, a ultrahigh molecular weight polyethylene, an ethylene-vinyl acetate copolymer and an ethylene-ethyl acrylate copolymer, polypropylenes such as a propylene homopolymer, a propylene-ethylene block copolymer or random copolymer and a propylene-ethylene-diene compound copolymer, 1-polybutene, poly 4-methyl-1-pentene, and the like may be included.

Among the polypropylenes, a crystalline polypropylene-based resin is often used, and as the crystalline polypropylene-based resin, for example, an isotactic propylene homopolymer having crystallinity, an ethylene-propylene random copolymer having a low content of an ethylene unit, a propylene block copolymer including a homopolymer portion having a propylene homopolymer and a copolymer portion having an ethylene-propylene random copolymer having a relatively high content of an ethylene unit, and furthermore, a crystalline propylene-ethylene-α-olefin copolymer in which each homopolymer portion or copolymer portion in the propylene block copolymer includes a product obtained by further copolymerizing α-olefin such as 1-butene may be included.

This olefinic thermoplastic resin may be used alone or in combination of two or more kinds, and a recycled article may be used.

(2) Olefinic Thermoplastic Elastomer

As the olefinic thermoplastic elastomer, an olefinic thermoplastic resin, and a mixture or a copolymerized product with rubber components, preferably olefinic rubber components, such as an ethylene-propylene copolymer (EPR) and an ethylene-butene copolymer (EBM) are preferred. In addition, it is preferred that the thermoplastic elastomer is a blend of rubber components which are kneadable with a thermoplastic resin.

In addition, it is not precluded to use a styrene-based thermoplastic elastomer, a polyester-based thermoplastic elastomer, a polyester-based thermoplastic elastomer, a vinyl chloride-based thermoplastic elastomer, a urethane-based thermoplastic elastomer, and the like.

(3) Inorganic Filler

The inorganic filler may include, for example, a carbonate-based filler such as calcium carbonate, magnesium carbonate, a hydroxide-based filler such as aluminum hydroxide and magnesium hydroxide, a sulfate-based filler such as calcium sulfate and barium sulfate, a silicate-based filler such as calcium silicate and magnesium silicate, kaolin, silica, perlite, calcined alumina, talc, mica, potassium titanate, glass fiber, and the like, and these materials may be used alone or in combination of two or more. In addition, performance of the inorganic filler such as thermal deformation stability and strength varies depending on a spherical, flat, needle or fibrous shape of the inorganic filler; however, from the viewpoint of the economic feasibility, calcium carbonate, talc, aluminum hydroxide, magnesium hydroxide, and the like are preferred.

In the transparent synthetic resin layer, the inorganic material such as silica, glass fiber or glass beads can be mixed for improving scratch resistance, wear resistance or the like, in a range which does not impair transparency, and the inorganic material may be surface-treated using an aliphatic acid, a coupling agent or the like for improving adhesiveness with the resin. In addition, a pearl pigment or the like may be added from a design property.

(4) Printing

The printed layer used in the present invention is formed by carrying out general printing such as gravure printing, screen printing, offset printing, letterpress printing, transfer printing, flexographic printing and inkjet printing, or coating with a comma coater, a roll coater, a die coater or the like, and a binder resin of a printing ink or coating material to be used is not particularly limited, and for example, any one among a polyurethane-based resin, a vinyl chloride-based resin, a vinyl chloride-vinyl acetate-based copolymer resin, a vinyl chloride-vinyl acetate-based copolymer resin/acrylic resin, a chlorinated polypropylene-based resin, an acrylic resin, a polyester-based resin, a polyamide-based resin, a butyral-based resin, a polystyrene-based resin, a nitrocellulose-based resin, an acetyl cellulose-based resin, and the like is used (may be used in combination). In addition, in the ink or coating material, a coloring agent such as a pigment and a dye, an extender pigment, a solvent, and the like are appropriately mixed. In addition, an isocyanate type or the like may be added as required to perform curing, or ionization radiation may be irradiated to perform curing.

The printing or coating may be performed on any one or both of the transparent layer and the colored layer.

(5) Inorganic Fiber Layer

As the inorganic fiber layer which is a portion of the intermediate layer 4, it is preferred to use inorganic fiber of a fabric structure including glass fiber, ceramic fiber, carbon fiber and the like. This inorganic fiber has good thermal stability and a small shrinkage rate to have a small change over time, and has an action to impart dimensional stability, thermal stability, unevenness resistance, ironing resistance, and the like.

In order to effectively perform this action, economically, glass fiber having abundant variation is preferred, and in particular, as the fabric structure, nonwoven fabric or plain cloth is preferable.

The mass of the inorganic fiber of this fabric structure is preferably about 20 to 300 g/m$^2$.

In addition, the inorganic fiber of the fabric structure may be subjected to surface treatment with a silane-based coupling agent and the like, and/or filling treatment for preventing fraying as desired for improving adhesiveness with the resin to be coated.

(6) Anti-Slip Material

As the anti-slip material, an olefinic thermoplastic resin and an olefinic thermoplastic elastomer and a thermoplastic resin and a thermoplastic elastomer other than an olefinic resin may be used. As the thermoplastic resin, an acrylic resin, a urethane-based resin, a polyester-based resin, and the like may be used. As the thermoplastic elastomer, acryl, styrene, urethane, polyester types, and the like may be used. In addition, the thermoplastic elastomer may be obtained by blending the thermoplastic resin with synthetic rubber. As the synthetic rubber, SBR, NBR, IR, and the like may be used.

To the anti-slip material, a coloring agent such as titanium oxide may be added, or an inorganic filler may be added to the extent of not impairing mechanical strength of the anti-slip layer, and for example, 100 parts or less is preferred.

The anti-slip layer may be laminated on the balance layer by a T-die extrusion laminator and the like, or may be formed by dissolving the anti-slip material in a solvent and the like to form a coating material, and applying the coating material on the balance layer in a smooth or pattern shape, which is then dried and solidified. In addition, mechanical bubbling or chemical bubbling is not precluded.

However, when the anti-slip layer is formed in a pattern shape, shaping by embossing can be omitted.

(7) Other Materials (a) Clear Coating Agent

In the present invention, on the surface of the laminated transparent synthetic resin layer, a clear coat layer to impart a contamination prevention function and a scratch resistance function can be formed.

This clear coat layer can be formed by coating or printing a material for forming the clear coat layer such as an acrylic resin or a urethane-based resin (if required, a curing agent may be added), or by forming an ionization radiation curable resin layer by coating or printing, and then irradiating ionization radiation thereto.

A photoinitiator, a leveling agent, a gloss adjusting agent may be added as required.

(b) Primer for Olefin

A primer for polyolefin may be used. For example, a curing agent such as an isocyanate type may be used by appropriately adding the curing agent to acid-modified polypropylene, chlorinated polypropylene, an acrylic resin, a urethane-based resin, a polyester-based resin or the like.

When using the primer, it is not precluded to previously perform activation treatment such as corona treatment on a target substrate.

(c) Other Additives

As other additives, for example, an antioxidant, a thermal stabilizer, an ultraviolet absorber, a light stabilizer, a flame retardant, a flame retardant aid, a lubricant, a release agent, a coloring agent, an antistatic agent, an anti-slip agent and the like may be appropriately contained.

Next, a method of manufacturing a recyclable synthetic resin tile to be laid which is the second aspect of the present invention will be described.

That is, as a-the method of manufacturing the recyclable synthetic resin tile to be laid according to the present invention, in a process for producing a synthetic resin tile with utilizing a rolling apparatus and equipment having a laminator part and an embossing part on a continuous line to the rolling apparatus, while forming a first intermediate layer which being one of the intermediate layers and having the largest thickness thereof, the intermediate layers (including an inorganic fiber layer), the balance layer and the decorative layer which were previously prepared, are sequentially laminated on the first intermediate layer one on other with each other so as to form a predetermined constitution thereof, and the decorative layer is shaped by embossing and the balance layer is shaped by embossing for increasing a surface area to secure adhesion.

Meanwhile, in another specific example of the second aspect of the present invention, in a process for producing a synthetic resin tile with utilizing a rolling apparatus and equipment having a laminator part and an embossing part on a continuous line to the rolling apparatus, while forming a first intermediate layer which being one of the intermediate layers and having the largest thickness thereof, the intermediate layers (including an inorganic fiber layer), the balance layer, the decorative layer and the anti-slip layer which were previously prepared, are sequentially laminated on the first intermediate layer one on other with each other so as to form a predetermined constitution thereof, and the decorative layer is shaped by embossing and the anti-slip layer is shaped by embossing so as to form a pattern such as a linear shape or a geometric pattern.

However, in the second aspect of the present invention, when performing the method of manufacturing the recyclable synthetic resin tile to be laid, for example, the transparent layer and the colored layer of the decorative layer are manufactured by kneading materials weighed in a predetermined formulation, and forming a film sheet by a rolling apparatus.

The transparent layer has a thickness in a range of 0.05 to 0.7 mm, and the colored layer has a thickness in a range of 0.05 to 0.2 mm. In the printing process, when the layer thickness is 0.2 mm or more, a drawback such as blurring occurs, and when the layer thickness is 0.05 mm or less, wrinkling occurs, and thus, which are not preferred.

The intermediate layers 4 (excluding the inorganic fiber layer) are manufactured by kneading materials weighed in a predetermined formulation, and forming a film by a rolling apparatus.

In a case when an used tile (in which construction materials such as adhesives, tackifiers, double-sided tapes, or a wooden material or cementitious material which is a material on the construction surface, or the like are not attached thereto), and having the same specification as that of the intermediate layers 4 is used as recycling materials for the intermediate layers 4 (excluding the inorganic fiber layer), crushed such tiles may be used.

The inorganic fiber layer is manufactured by coating, drying and solidifying inorganic fiber (a mass of 20 to 300 g/m$^2$) having a fabric structure with a resin composition including an aqueous or solvent-based thermoplastic resin and/or thermoplastic elastomer, using a dipping coating apparatus and the like. The resin composition contains at least the olefinic thermoplastic resin and/or thermoplastic elastomer, and may contain 350 parts or less of the inorganic filler. In addition, the inorganic fiber layer may also be manufactured by coating the glass fiber having a fabric structure with a coating material obtained by stirring and mixing the thermoplastic resin and/or thermoplastic elastomer and a predetermined amount of the inorganic filler, by using a T-die extrusion and the like, so that the coating material and the fabric structure are integrated into one body, or by bonding and integrating a film body previously formed into a sheet shape with the inorganic fiber having a fabric structure by a rolling apparatus. The inorganic fiber layer has a thickness in a range of 0.06 mm to 1 mm.

The balance layer 5 is manufactured by kneading materials weighed in a predetermined formulation, and forming a film by a rolling apparatus. The thickness thereof is 0.3 to 1 mm. The inorganic filler may be added at 300 parts or less.

The anti-slip layer 55 is manufactured by kneading materials weighed in a predetermined formulation, and forming a film at a thickness of 0.1 to 1 mm by a rolling apparatus. The inorganic filler may be added at 100 parts or less.

The anti-slip layer 55 may be laminated on the balance layer 5 by a T-die extrusion laminator and the like, or may be formed by forming the anti-slip resin composition into a coating material, and by applying the coating material on the balance layer 5 in a smooth or pattern shape, which is dried and solidified.

However, when the anti-slip layer is formed in a pattern shape, concave-convex shaping can be omitted.

The decorative layer 3 (the transparent layer 301 and the printed colored layer 302), the intermediate layer 401, the inorganic fiber layer 402, and the balance layer 5 are previously prepared, and while the intermediate layer 403 which is the thickest layer among the intermediate layers 4 is formed into a film by a rolling apparatus, each layer is heated to be the layer constitution of FIG. 1(A), with continuous manufacturing equipment, and laminated with a laminator roll. The layers are heated so that the temperature of a vicinity of a surface of the base part 2 is 130 to 160° C., and the decorative layer 3 is shaped by the embossing roll. The layers are heated so that the temperature of a vicinity of a back surface of the base part 2 is 130 to 160° C., and in order to increase a surface area to secure adhesion in the balance layer 5, concave-convex shaping is performed by the embossing roll. The balance layer 5 which is previously embossed may be laminated.

In addition, in FIG. 1(B), the decorative layer 3 (the transparent layer 301 and the printed colored layer 302), the intermediate layer 401, the inorganic fiber layer 402, the balance layer 5, and the anti-slip layer 55 are prepared, and while the intermediate layer 403 which is the thickest layer among the intermediate layers 4 is formed into a film by a rolling apparatus, each layer is heated to be the layer constitution of FIG. 1(B), with continuous manufacturing equipment, and laminated with a laminator roll. Heating is performed so that the temperature of a vicinity of a surface of the base part 2 is 130 to 160° C., the decorative layer 3 is shaped by the embossing roll, heating is performed so that the temperature of a vicinity of the anti-slip layer laminated on the base part 2 is 130 to 160° C., and the anti-slip layer 55 is shaped to be concave-convex by the embossing roll.

The anti-slip layer 55 may be previously laminated with the balance layer 5, and the anti-slip layer 55 may be introduced and laminated after embossing shaping on the decorative layer 3, and shaped to be concave-convex by the embossing roll.

In addition, cooling is performed after embossing shaping, and the tile is manufactured by being cut into a desired size.

Before cutting the tile into a desired size, a top coat layer may be formed. The top coat layer may be used by adding an additive for imparting luster adjustment, scratch resistance, contamination resistance, an antistatic property, an anti-slip property, and the like thereinto.

The tiles cut into a desired size may be chamfered or R-face processed, or may be formed by cutting a fitting for joining the tiles with an NC router or the like.

Hereinafter, the Examples for the recyclable synthetic resin tile to be laid, the recyclable synthetic resin tile to be laid having an anti-slip function, and the method of manufacturing the same according to the present invention will be described.

Manufacture of Examples

As in (1) to (5) described below, each constituent layer was manufactured, previously, and while the intermediate layer 403 having the largest thickness is formed by kneading the materials as blended as shown in each Examples and by forming a film sheet having a thickness as shown in the Examples by a rolling apparatus, and each one of the above mentioned previously formed constituent layers is sequentially laminated on the intermediate layer 403, respectively, with a laminator so that the layers are stacked each other as illustrated in tile configuration diagrams as shown in FIGS. 1(A) and 1(B). Heating was performed so that the temperature of the vicinity of the surface of the base part 2 was 140° C., the decorative layer 3 was shaped by the embossing roll (wood grain vessel embossing), heating was performed so that the temperature of the vicinity of the back surface of the base part 2 or the vicinity of the anti-slip layer laminated on the base part 2 was 140° C., and when the lowermost layer was the balance layer 5, the balance layer was shaped by a pyramid-shaped concave embossing roll, and the anti-slip layer 55 was shaped in a zigzag pattern when the anti-slip layer has a planar shape, and shaped by an embossing roll having a trapezoidal cross-sectional shape, and after cooling, the tile was manufactured by being cut into a size of 457.2×457.2 mm.

(1) Manufacturing Method of Decorative Layer 3

The transparent layer 301 of the decorative layer was manufactured by kneading materials weighed in a formulation of each Example, and forming a film of each Example having a thickness of 0.4 mm and 0.5 mm by the rolling apparatus. The colored layer 302 was manufactured by kneading materials weighed in a formulation of each Example, and forming a film at 0.1 mm by the rolling apparatus.

The front and back surfaces of the transparent layer 301 and the colored layer 302 were all subjected to corona treatment. An ink including a urethane-based resin as a binder to which a curing agent was added was used, and a wood grain pattern having a three plate constitution was printed on the colored layer 302 by a gravure printer. The printed layer 303 had a thickness of 0.01 mm. The transparent layer 301 and the colored layer 302 after being printed were prepared by winding in a roll shape.

(2) Manufacturing Method of Intermediate Layer 4

The intermediate layer 401 was manufactured by kneading materials weighed in a formulation of each Example, forming films at 0.7 mm and 0.9 mm by the rolling apparatus, and winding the film in a roll shape.

(3) Manufacturing Method of Inorganic Fiber Layer 402

On glass fiber nonwoven fabric (unit weight of 50 g/m$^2$), an aqueous resin (a solid content of 30%) including a modified PP resin and an acrylic resin was applied or coated using a dip coating apparatus, and dried and consolidate, and then wound in a roll shape, thereby preparing the inorganic fiber layer 402. The thickness was 0.3 mm.

(4) Manufacturing Method of Balance Layer 5

Materials weighed in a formulation of each Example were kneaded, and a film was formed at a thickness of 0.8 m by the rolling apparatus, and wound in a roll shape, thereby preparing the balance layer 5.

(5) Manufacturing Method of Anti-Slip Layer 55

Materials weighed in a formulation of Example 4 were kneaded, and a film was formed at a thickness of 0.25 mm by the rolling apparatus, and wound in a roll shape, thereby preparing the anti-slip layer 55.

Example 1

The transparent layer 301 had a composition ratio of the olefinic thermoplastic resin (manufactured by Hanwha Total; PP RF 401, hereinafter, referred to as PP) and the olefinic thermoplastic elastomer (manufactured by LG Chemicals; LUCENE LC-100, hereinafter, referred to as LC-100) being 1:1, and a thickness of 0.4 mm. The colored layer 302 had a resin composition ratio of the olefinic thermoplastic resin (PP) and the olefinic thermoplastic elastomer (LC-100) being 1:3, and including 350 parts of the inorganic filler and 10 parts of the coloring agent (titanium oxide), and a thickness of 0.1 mm.

The intermediate layer 401 had a resin composition ratio of the olefinic thermoplastic resin (PP) and the olefinic thermoplastic elastomer (LC-100) being 4:1, and including 300 parts of the inorganic filler, and a thickness of 0.9 m.

The balance layer 5 had a resin composition ratio of the olefinic thermoplastic resin (PP) and the olefinic thermoplastic elastomer (LC-100) being 4:1, and including 150 parts of the inorganic filler, and a thickness of 0.8 mm. Each layer was sequentially laminated with continuous manufacturing equipment, as in the configuration diagram (FIG. 1A), while the intermediate layer 403 having the largest thickness (having a resin composition ratio of the olefinic thermoplastic resin (PP) and the olefinic thermoplastic elastomer (LC-100) being 1:4, and including 300 parts of the inorganic filler, and a thickness of 1.5 mm, which was a layer of the intermediate layers 4 was formed, and immediately before shaping by the embossing roll, heating was performed so that the temperature of the vicinity of the front and back surfaces of the base part 2 was 140° C., respectively, and the front and back surfaces were shaped by the embossing roll, and the tile was manufactured by being cooled and cut into a size of 457.2×457.2 mm. In this case, the thickness was 4 mm.

Example 2

The transparent layer 301 had a resin composition ratio of the olefinic thermoplastic resin (PP) and the olefinic thermoplastic elastomer (LC-100) being 1:1, and a thickness of 0.5 mm.

The colored layer 302 had a resin composition ratio of the olefinic thermoplastic resin (PP) and the olefinic thermoplastic elastomer (LC-100) being 1:3, and including 50 parts of the inorganic filler and 10 parts of the coloring agent (titanium oxide), and a thickness of 0.1 mm. The intermediate layer 401 had a resin composition ratio of the olefinic thermoplastic resin (PP) and the olefinic thermoplastic elastomer (LC-100) being 3:2, and including 450 parts of the inorganic filler, and a thickness of 0.7 mm.

The balance layer 5 had a resin composition ratio of the olefinic thermoplastic resin (PP) and the olefinic thermoplastic elastomer (LC-100) being 5:4 and including 150 parts of the inorganic filler, and a thickness of 0.8 mm.

Each layer was sequentially and respectively laminated on the intermediate layer 403 with continuous manufacturing equipment, as in the configuration diagram (FIG. 1A), while the intermediate layer 403 having the largest thickness (having a resin composition ratio of the olefinic thermoplastic resin (PP) and the olefinic thermoplastic elastomer (LC-100) being 2:3, and including 500 parts of the inorganic filler, and a thickness of 2.3 mm) which is one of the intermediate layers 4, was formed, and immediately before shaping by the embossing roll, heating was performed so that the temperature of the vicinity of the front and back surfaces of the base part 2 was 140° C., respectively, and the front and back surfaces were shaped by the embossing roll, and the tile was manufactured by being cooled and cut into a size of 457.2×457.2 mm. In this case, the thickness was 4.8 mm.

Example 3

The process was performed in the same manner as in Example 2, except that the tiles manufactured in Example 2 were laid down for 1 month and then collected, and in order to use the product crushed to a 5 mm square, the intermediate layer 403 having the largest thickness (having a resin composition ratio of the olefinic thermoplastic resin (PP) and the olefinic thermoplastic elastomer (LC-100) being 1:1, and including 250 parts of the inorganic filler and 210 parts of the crushed product, and a thickness of 2.3 mm) which is one of the intermediate layers 4 was manufactured. In this case, the thickness was 4.8 mm.

Example 4

The anti-slip layer 55 had a resin composition ratio of the olefinic thermoplastic resin (PP) and the olefinic thermoplastic elastomer (LC-100) being 1:3, and including 1 part of the coloring agent (titanium oxide), and a thickness of 0.25 mm.

As illustrated in the configuration diagram (FIG. 1B), the anti-slip layer 55 was laminated with the continuous manufacturing equipment, and immediately before shaping by the embossing roll, heating was performed so that the temperature of the surface of the base part 2 and the vicinity of the anti-slip layer laminated on the base part 2 was 140° C., and shaping was performed by the embossing roll, and the tiles were manufactured by being cooled and cut into a size of 457.2×457.2 mm. The thickness was 5 mm.

The embossing to the anti-slip layer had a zigzag pattern in a planar shape, the sectional shape being adopted a trapezoidal shape, and when the applied pressing force was released, no negative pressure occurred in the recessed portion, and a height difference between the protruding portion and the recessed portion was 0.3 mm.

Example 5

The process was performed in the same manner as in Example 4, except that the same anti-slip layer 55 as used in Example 4 was laminated on the tile of Example 3, with the continuous production equipment. The thickness was 5 mm.

Comparative Example 1

In Comparative Example 1, a PVC tile to be laid having an anti-slip function was manufactured by using a tile to be laid made of a 4.5 mm vinyl chloride resin, and carrying out an anti-slip process (a protruding height of 0.5 mm), based on JP 4053391 B2.

The manufacturing method was not particularly limited to the method described above, and for example, may be a method of previously manufacturing all layers forming the tile, winding the layers (or sheet-fed laminating the layers), heating each layer, and sequentially laminating the layers, and shaping the back surface by embossing, or a method of overlapping all layers forming the tile in a single sheet according to the configuration diagram, and laminating the layers by a heating press, and simultaneously shaping the back surface.

(Evaluation of Performance)

Warping, a change in length due to heating, a residual dent amount, and a coefficient of thermal expansion with respect to a sample manufactured in each Example were measured in accordance with JIS A 1454, and compared with those of the product specification of the vinyl tile (a vinyl floor tile to be laid) of JIS A 5705.

In addition, with respect to the anti-slip effect, the sample was slid on a glass plate having a smooth surface with a hand, and then the tactile sensation was determined. The results are shown in Table 1, and the performance equivalent to the specification of the vinyl tile was obtained.

(Evaluation of Performance)

TABLE 1

| Item | | Unit | Example 1 | Example 2 | Example 3 | Example 4 | Example 5 | Comparative Example 1 | JIS A 5705: 2010 |
|---|---|---|---|---|---|---|---|---|---|
| Residual dent amount | | mm | 0.40 | 0.45 | 0.44 | 0.45 | 0.45 | 0.44 | 0.45 or less |
| Rate of change in length due to heating | Width | % | 0.03 | 0.02 | 0.02 | 0.02 | 0.02 | −0.02 | 0.15 or less |
| | Length | | −0.04 | −0.06 | −0.05 | −0.06 | −0.06 | −0.05 | |
| Warping | (5° C.) | mm | −1.50 | −1.80 | −1.80 | −1.90 | −1.80 | −0.30 | 0.6~(−2.0) |
| | (23° C.) | | −0.50 | −0.30 | −0.40 | −0.40 | −0.40 | −0.70 | |
| Coefficient of thermal expansion | | ×10$^{-5}$ | 5.70 | 6.00 | 5.90 | 6.00 | 6.00 | 4.20 | 6 or less |
| Slipping property evaluation | | | | | | | | | |
| Transverse direction | | | X | X | X | ○ | ○ | Δ | None |
| Oblique direction | | | X | X | X | ○ | ○ | Δ~○ | None |

Warping test method: in accordance with JIS A 1454.
Standard value of a vinyl floor tile to be laid (JIS A 5705): 0.5 mm or less, (−) 2 mm or less
Warping at low temperature: A warped state was measured after being allowed to stand in a constant temperature bath set at 5° C. for 1 hour.
Warping at room temperature: A warped state was measured after being allowed to stand in a constant temperature bath set at 23° C. for 1 hour.
Sample size: 457.2×457.2 mm
Rate of change in length due to heating: in accordance with JIS A 1454.
Standard value of a vinyl floor tile to be laid (JIS A 5705): 0.15% or less
The dimensions of the width and length were previously measured using Vernier Calipers, and the tile was allowed to stand in a constant temperature bath set at 80° C. for 6 hours, and then taken out and allowed to stand at room temperature for 2 hours, and then the dimension was measured again, thereby obtaining the rate of change.
Residual dent amount: in accordance with JIS A 1454.
Standard value of a vinyl floor tile to be laid (JIS A 5705): 0.45 mm or less.

The specimen was allowed to stand in a room at constant temperature for 1 hour and then placed on a test machine, and a load of 356 N was applied for 10 minutes. The dent amount 1 hour after removing the load was measured with a dial gauge, thereby obtaining the residual dent amount.

Coefficient of thermal expansion: in accordance with JIS A 1454: 2010.

Standard value of a vinyl floor tile to be laid (JIS A 5705): $6 \times 10^{-5}$ or less.

The tile was allowed to stand in a laboratory at a temperature of 5±2° C. for 24 hours or more, and then the dimension was measured, and the dimension is the length or width of the specimen at 5° C. The specimen after completing measurement was allowed to stand in a laboratory at 32±2° C. for 24 hours, and then the dimension was measured. This was set as the dimension at 35° C. The coefficient of thermal expansion was obtained by calculation.

Test Method and Evaluation of Slipping Property:

Transverse direction: hard to slip when the tile was allowed to stand on a glass plate, and the side of the tile was horizontally pressed with a finger.

Oblique direction: hard to slip when the tile was allowed to stand on a glass plate, and the corner of the tile side was obliquely pressed up so as to be pushed to the side.

○: very resistant, and hardly slippery
Δ: resistant, but slippery
x: slippery almost without resistance

The invention claimed is:

1. A recyclable synthetic resin tile to be laid, comprising a base part in which a decorative layer including at least a colored or colorless transparent layer, a printed layer and an opaque or translucent colored layer, two or more intermediate layers, and a balance layer laminated in this order, wherein a main constituent resin of at least the decorative layer the intermediate layer and the balance layer includes a combination of one or more olefinic thermoplastic resin and/or one or more olefinic thermoplastic elastomer, wherein a layer of the intermediate layers includes an inorganic fiber layer, the decorative layer is shaped by embossing, the balance layer is shaped by embossing for increasing a surface area to secure adhesion, and the synthetic resin tile has a total thickness of 2.5 mm to 8 mm.

2. The recyclable synthetic resin tile to be laid according to claim 1, wherein the inorganic fiber layer includes inorganic fibers formed into a fabric structure and coated with the resin composition comprising at least the olefinic thermoplastic resin and/or thermoplastic elastomer as well as inorganic fillers, an added amount thereof being 350 parts or less including 0 parts.

3. The recyclable synthetic resin tile to be laid according to claim 1, wherein the inorganic fiber is a glass fiber which is formed into a fabric structure having a mass of 20 to 300 g/m².

4. The recyclable synthetic resin tile to be laid according to claim 1, wherein each one of a colored layer of the decorative layer, the two or more intermediate layers (excluding the inorganic fiber layer), and the balance layer comprises said main constituent resin consisting of the olefinic thermoplastic resin and the olefinic thermoplastic elastomer, wherein a resin composition ratio thereof being in a range of 20:80 to 80:20, and further wherein, said main constituent resin further includes therein said inorganic filler being the same or different kind of materials from each other or which are different in particle shape and/or a different in particle diameter, from each other, and further wherein, in the colored layer of the decorative layer, said inorganic filler is added thereto at 150 parts or less including 0, in the two or more intermediate layers (excluding the inorganic fiber layer), said inorganic filler being added thereto at 200 to 600 parts and in the balance layer, said inorganic filler being added thereto at 300 parts or less including 0 parts.

5. The recyclable synthetic resin tile to be laid according to claim 1, wherein the colored or the colorless transparent layer of the decorative layer has a resin composition ratio of the thermoplastic resin and the thermoplastic elastomer in a range of 40:60 to 70:30.

6. A recyclable synthetic resin tile to be laid having an anti-slip function, comprising
a base part including a decorative layer including at least a colored or colorless transparent layer, a printed layer and an opaque or translucent colored layer, two or more intermediate layers, and a balance layer, wherein a main constituent resin of at least the decorative layer, the intermediate layer and the balance laver includes one or more olefinic thermoplastic resin and/or one or more olefinic thermoplastic elastomer, and
an anti-slip layer formed by a resin composition wherein a main constituent resin includes one or a combination of two or more of a thermoplastic resin and/or thermoplastic elastomer, the layers being laminated in this order,
wherein a layer of the intermediate layers includes an inorganic fiber layer, and the decorative layer is shaped by embossing, the anti-slip layer being provided with concave-convex portions on one surface thereof and the configuration of which is designed so that no closed space surrounded by a seamless protruding portion of said concave-convex portions is created in an inner portion thereof, and wherein a height difference between a protruding portion and a recessed portion of said concave-convex portion is in a range of 0.2 to 0.6 mm, and a total thickness of said resin tile is 3 mm to 8 mm.

7. The recyclable synthetic resin tile to be laid having an anti-slip function according to claim 6, wherein the inorganic fiber layer includes inorganic fibers formed into a fabric structure and coated with the resin composition comprising at least the olefinic thermoplastic resin and/or thermoplastic elastomer as well as inorganic fillers, an added amount thereof being 350 parts or less including 0 parts.

8. The recyclable synthetic resin tile to be laid having an anti-slip function according to claim 6, the inorganic fiber is a glass fiber which is formed into a fabric structure having a mass of 20 to 300 g/m².

9. The recyclable synthetic resin tile to be laid having an anti-slip function according to claim 6, wherein each one of the colored layer of the decorative layer, the two or more intermediate layers (excluding the inorganic fiber layer), and the balance layer comprises said synthetic resin consisting of the olefinic thermoplastic resin and the olefinic thermoplastic elastomer, wherein a resin composition ratio thereof is in a range of 20:80 to 80:20, and further wherein, said synthetic resin further includes therein said inorganic filler being the same or a different kind of materials or a combination of the same or different kind of materials having a different particle shape and/or a different particle diameter, and further wherein, in the colored layer of the decorative layer, said inorganic filler being added thereto at 150 parts or less including 0, in the two or more intermediate layers (excluding the inorganic fiber layer), said inorganic filler being added thereto at 200 to 600 parts and in the balance layer, said inorganic filler being added thereto at 300 parts or less including 0 parts.

10. The recyclable synthetic resin tile to be laid having an anti-slip function according to claim 6, wherein the colored or the colorless transparent layer of the decorative layer has a resin composition ratio of the olefinic thermoplastic resin and the olefinic thermoplastic elastomer being in a range of 40:60 to 70:30.

11. The recyclable synthetic resin tile to be laid having an anti-slip function according to claim 6, wherein the anti-slip layer includes one or two or more of the thermoplastic resin and/or thermoplastic elastomer, wherein it further contains at least the olefinic thermoplastic resin and/or the thermoplastic elastomer, and further wherein said anti-slip layer including therein the inorganic filler with an added amount thereof being 100 parts or less including 0 parts, and further wherein said anti-slip layer having a thickness of 0.2 to 1 mm.

12. The recyclable synthetic resin tile to be laid having an anti-slip function according to claim 6, wherein the anti-slip layer has a smooth layer having a thickness of 0.2 mm to 1 mm laminated with said resin composition forming the anti-slip layer, with using the balance layer as a base material.

13. The recyclable synthetic resin tile to be laid having an anti-slip function according to claim 6, wherein a surface of the anti-slip layer is shaped to be a concave-convex configuration forming a pattern such as a linear shape or a geometric pattern, and said configuration including therein no recessed portion formed by being surrounded by one or plural protruding portions which generating no negative pressure therein when a pressure applied to the tile is released, and further wherein a height difference between the protruding portion and the recessed portion is in a range of 0.2 to 0.6 mm.

14. The recyclable synthetic resin tile to be laid having an anti-slip function according to claim 6, wherein said anti-slip layer is formed on a surface of said balance layer as a base material using said resin composition, and said anti-slip layer is shaped to have pattern configurations such as a linear shape or a geometric pattern, and wherein a height of the protruding portion in said pattern is in a range of 0.2 to 1 mm, and further wherein said pattern configurations include therein no recessed portion formed by being surrounded by one or plural protruding portions which generating no negative pressure therein when an pressure applied to the tile is released.

15. A method of manufacturing the recyclable synthetic resin tile to be laid according to claim 1, in a process for producing a synthetic resin tile with utilizing a rolling apparatus and equipment having a laminator part and an embossing part on a continuous line to the rolling apparatus, while forming a first intermediate layer being one of the intermediate layers and having the largest thickness thereof, said intermediate layers (including an inorganic fiber layer), said balance layer and said decorative layer which were previously prepared, are sequentially laminated on said first intermediate layer and/or one on other with each other so as to form a predetermined constitution thereof, wherein, a vicinity of a front surface (decorative layer) and a back surface (balance layer) of a base part are heated to 130 to 160° C., and the decorative layer is shaped by embossing and the balance layer is shaped by embossing for increasing a surface area to secure adhesion.

16. A method of manufacturing the recyclable synthetic resin tile to be laid having an anti-slip function according to claim 6, in a process for producing a synthetic resin tile with a rolling apparatus and equipment having a laminator part and an embossing part on a continuous line to the rolling apparatus, while forming a first intermediate layer which is one of the intermediate layers and has the largest thickness thereof, said intermediate layers (including an inorganic fiber layer), said balance layer, said decorative layer and said anti-slip layer, which were previously prepared, are sequentially laminated on said first intermediate layer and/or one on other with each other so as to form a predetermined constitution thereof, wherein a vicinity of a front surface (decorative layer) and a back surface (anti-slip layer) of a base part are heated to 130 to 160° C., and the decorative layer is shaped by embossing and the anti-slip layer is shaped by embossing so as to form patterns which does not include a pattern having an inner closed space formed by surrounded with the seamless protruding portions and further wherein a height difference between a protruding portion and a recessed portion of said pattern is in a range of 0.2 to 0.6 mm.

17. A method of manufacturing the recyclable synthetic resin tile to be laid having an anti-slip function according to claim 14, in a process for producing a synthetic resin tile with utilizing a rolling apparatus and equipment having a laminator part and an embossing part on a continuous line to the rolling apparatus, while forming a first intermediate layer which is one of the intermediate layers and has the largest thickness thereof, said intermediate layers (including an inorganic fiber layer), said balance layer having an anti-slip layer previously formed in a pattern shape, and said decorative layer, which were previously prepared, are sequentially laminated on said first intermediate layer and/or one on other with each other so as to form a predetermined constitution thereof, wherein a vicinity of a surface (decorative layer) of a base part is heated to 130 to 160° C., and the decorative layer is shaped by embossing.

* * * * *